United States Patent
Gillis et al.

(10) Patent No.: US 6,680,811 B2
(45) Date of Patent: Jan. 20, 2004

(54) SYSTEM AND METHOD FOR ENHANCING LOAD/UNLOAD PERFORMANCE OF LOW-FLYING HEADS IN A DISK DRIVE

(75) Inventors: Donald R. Gillis, San Jose, CA (US); Mike Suk, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 09/973,296

(22) Filed: Oct. 9, 2001

(65) Prior Publication Data

US 2003/0067706 A1 Apr. 10, 2003

(51) Int. Cl.[7] .............................................. G11B 21/02
(52) U.S. Cl. ...................................... 360/75; 360/73.03
(58) Field of Search ............................... 360/75, 73.03, 360/25, 97.01, 137, 234, 234.2, 234.7

(56) References Cited

U.S. PATENT DOCUMENTS

| | | | | |
|---|---|---|---|---|
| 4,605,977 A | * | 8/1986 | Matthews | 360/234.7 |
| 4,606,638 A | * | 8/1986 | Sommargren | 356/492 |
| 4,777,544 A | * | 10/1988 | Brown et al. | 360/75 |
| 4,853,810 A | * | 8/1989 | Pohl et al. | 360/234.7 |
| 5,153,785 A | * | 10/1992 | Muranushi et al. | 360/75 |
| 5,168,413 A | * | 12/1992 | Coker et al. | 360/137 |
| 5,303,099 A | | 4/1994 | Kawazoe | |
| 5,377,058 A | * | 12/1994 | Good et al. | 360/75 |
| 5,561,570 A | | 10/1996 | Gill et al. | |
| 5,734,524 A | * | 3/1998 | Ruiz | 360/234 |
| 5,764,430 A | | 6/1998 | Ottesen et al. | |
| 5,801,894 A | | 9/1998 | Boutaghou et al. | |
| 5,880,840 A | * | 3/1999 | Li | 356/507 |
| 5,991,113 A | * | 11/1999 | Meyer et al. | 360/75 |
| 6,002,552 A | | 12/1999 | Leung | |
| 6,023,393 A | * | 2/2000 | White | 360/234.2 |
| 6,057,984 A | | 5/2000 | Arita et al. | |
| 6,067,203 A | | 5/2000 | Ottesen et al. | |
| 6,246,538 B1 | * | 6/2001 | Kasamatsu et al. | 360/97.01 |
| 6,366,416 B1 | * | 4/2002 | Meyer et al. | 360/25 |
| 6,411,458 B1 | * | 6/2002 | Billings et al. | 360/75 |

* cited by examiner

*Primary Examiner*—David Hudspeth
*Assistant Examiner*—Fred F. Tzeng
(74) *Attorney, Agent, or Firm*—Robert B. Martin; Bracewell & Patterson, L.L.P.

(57) ABSTRACT

A disk drive utilizes a slider that is designed to fly very high or well above the surface of the disk when loading onto the disk and until a reading or writing operation requires the head to go to a relatively low-flying position with respect to the disk. Thus, the slider has two or more altitudes at which it flies depending on the operating conditions of the disk drive. The different altitudes of the slider are achieved by adjusting three primary variables: the rotational speed of the disk, selecting the radial position of the slider/actuator arm, and by the gram load. Other factors that may be used to tune this performance include pitch static attitude, pitch stiffness, and air bearing surface design.

12 Claims, 2 Drawing Sheets

SYSTEM AND METHOD FOR ENHANCING LOAD/UNLOAD PERFORMANCE OF LOW-FLYING HEADS IN A DISK DRIVE

BACKGROUND OF THE INVENTION

1. Technical Field

The present invention relates in general to an improved disk drive, and in particular to an improved system and method for enhancing the loading and unloading performance of low-flying heads in a disk drive.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

One problem associated with load/unload disk drives is the risk of undesirable slider/disk contacts during the load operation due to the relatively large distances that the head must move to initiate a read/write operation. Such a contact can damage the head and/or the disk, thereby reducing the performance of or completely disabling the drive. A number of solutions have been proposed to reduce this risk, such as those of U.S. Pat. Nos. 6,057,984, and 5,303,099. These approaches teach one to spin the disks up to higher speeds to increase the flying height, and to control the flying height over the bumps, respectively. However, in both cases, the flying height is being adjusted within the normal flying height range of 10 to 20 nm, or much less than 100 nm are more applicable to contact-start-stop drives. Although these designs are workable, the heads are still vulnerable to contacting the disk since the slider comes very close to the disk surface during a loading operation. An improved solution is needed.

SUMMARY OF THE INVENTION

In one embodiment of a disk drive constructed in accordance with the present invention, the slider is designed to fly very high or well above the surface of the disk when loading onto the disk and until a reading or writing operation requires the head to go into pseudo-contact or a relatively low-flying position with respect to the disk. Thus, the slider has two or more altitudes at which it flies depending on the operating conditions of the disk drive. The different altitudes of the slider are achieved by adjusting three primary variables: the rotational speed of the disk, selecting the radial position of the slider/actuator arm, and gram load. Other factors that may be used to tune this performance include pitch static attitude, pitch stiffness, and air bearing surface design.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
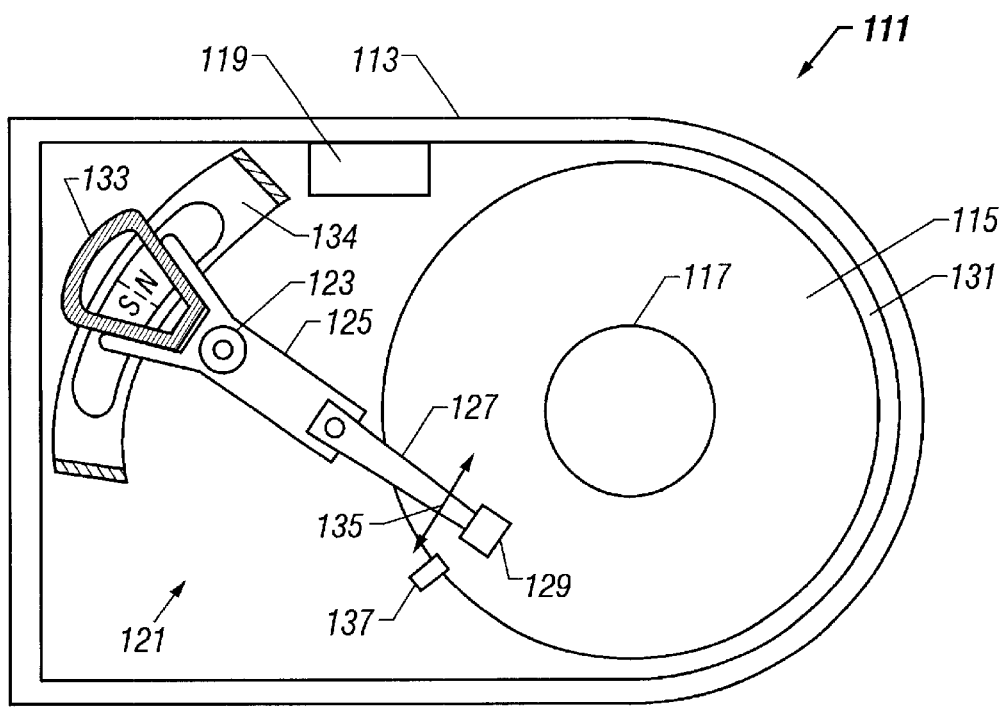
FIG. 1 is a plan view of one embodiment of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another. A load/unload ramp 137 is located adjacent to disks 115.

In order to reduce the risk of undesirable contacts between heads 129 and disks 115 during loading operations, a number of performance variables may be adjusted with respect to drive 111 to more gradually allow the heads to proceed toward the disks. In the present invention, the sliders are designed to fly relatively high or well above the surface of disks 115 until a reading or writing operation requires heads 129 to go into pseudo-contact or a relatively low-flying position with respect to disks 115. Thus, the slider has two or more altitudes at which it flies, depending on the operating conditions of the disk drive. However, the present invention differs significantly from the prior art since the "intermediate" flying height (i.e., the flying height between the load/unload height and the read/write height) is on the order of 1000 nm, or 1 micron. Such an intermediate flying height is at least one order of magnitude greater that the read/write flying height, which is typically on the order of 10 to 20 nm, and is usually in the range of approximately two to twenty times greater than the read/write flying height.

The different altitudes of the slider are achieved by adjusting three primary variables: the rotational speed of the disk, selecting the radial position of the slider/actuator arm, and gram load. Other factors that may be used to tune this performance include pitch static attitude, pitch and/or suspension stiffness, and air bearing surface design.

Figure 2:
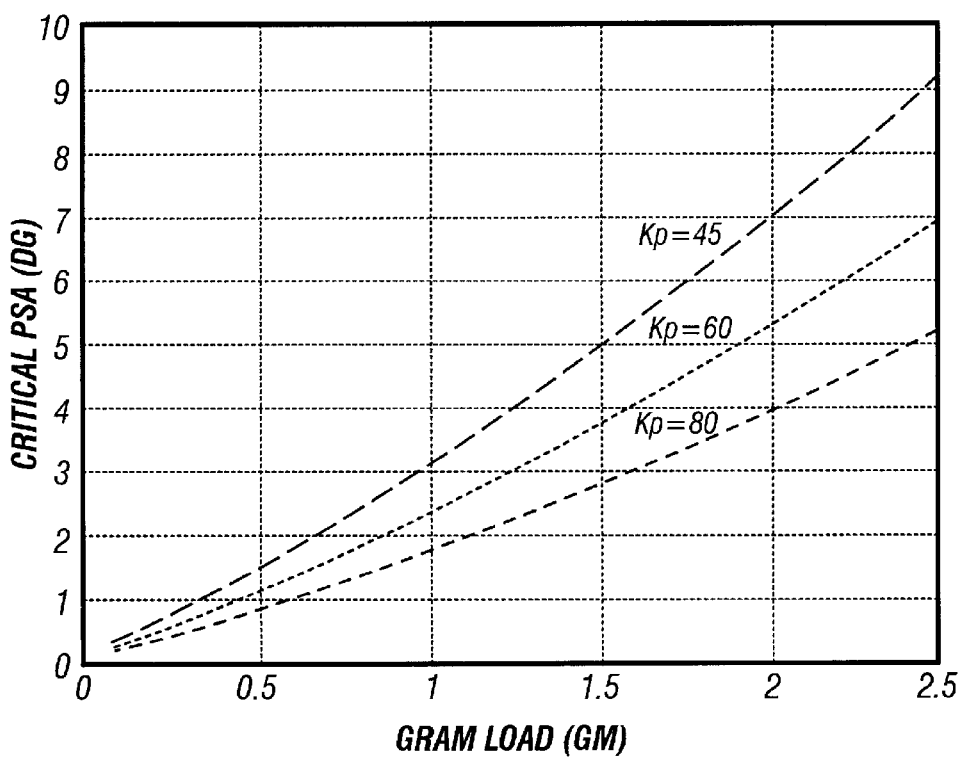
FIG. 2 is a plot of the response of the disk drive of FIG. 1 when subjected to a number of variables, including disk rotational speed, gram load, and suspension stiffness.

For example, FIG. 2 depicts a plot of the response of disk drive 111 when subjected to a number of variables, including disk rotational speed, gram load, and suspension stiffness. The vertical axis depicts critical pitch static attitude (PSA), and the horizontal axis depicts gram load, or the load applied to the slider by the suspension. In addition, three plots 201, 203, 205 are shown for three different flexure stiffnesses.

As an example, if the flexure stiffness is 60 mm*mN/rad, then, for a given disk linear speed, the slider will fly around 1 μm high if the combination of given PSA and gram load falls above the curve. If the combination of given PSA and the gram load falls below the curve, the slider will fly at the nominal flying height for reading and writing. The curve that represents the 60 mm*mN/rad will shift up as the disk linear speed is decreased. Thus, if the disk speed is sufficiently decreased, the slider that flies at around 1 μm will suddenly move to a lower flying height state. For example, consider a case where PSA is three degrees, the gram load is 1 gram, and the pitch stiffness is 60 mm*mN/rad. For this case, when the slider is loaded onto the disk, the slider will fly at around 1 μm. As the disk linear speed is decreased, the 60 mm*mN/rad curve shifts up. As the shifting curve passes beyond the point represented by PSA of three degrees, gram load of 1 gram, the slider will move to a lower flying height state. Even if the disk speed is increased from this point, the slider will remain in the lower flying height state. The only way to move into a higher flying height state is to unload the heads.

Figure 3:
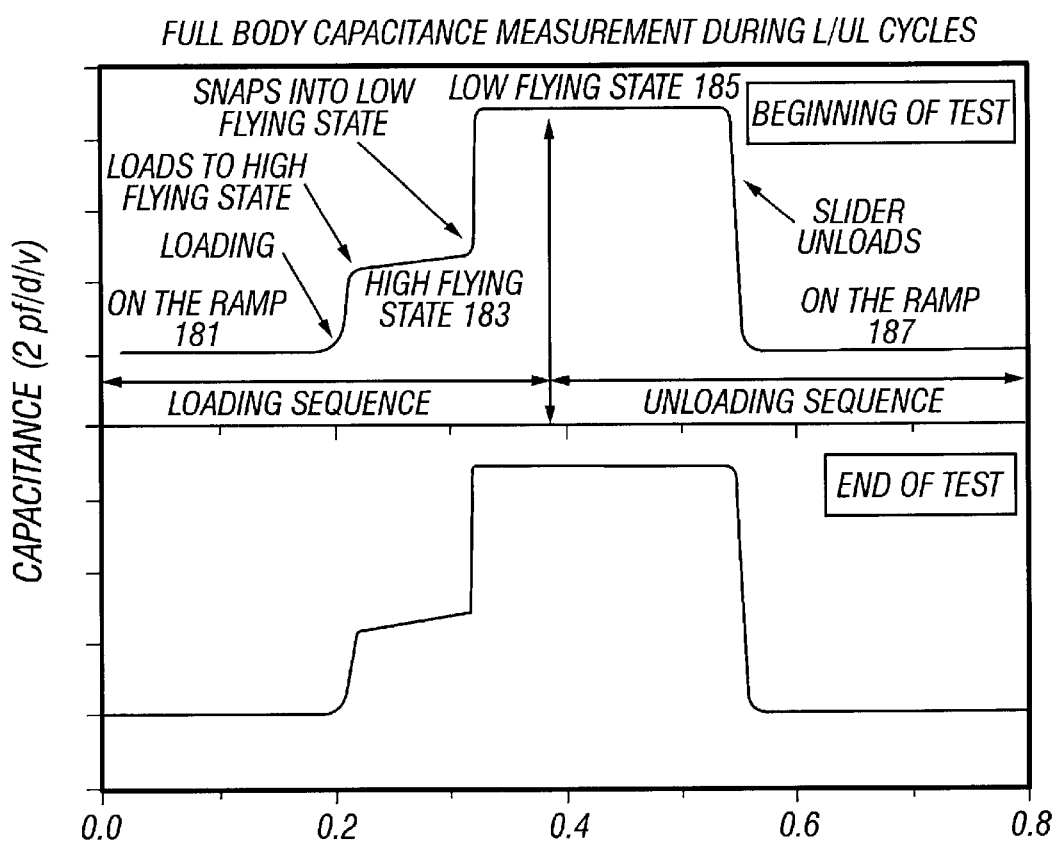
FIG. 3 is a plot of the relative flying height of a head in the disk drive of FIG. 1 during a test sequence that simulates a loading and unloading cycle.

Referring now to FIG. 3, a plot of the relative flying height of head 129 in disk drive 111 during a test sequence that simulates a loading and unloading cycle is shown. In this test, the flying height is directly proportional to the full body capacitance measurement during the load/unload cycles. In FIG. 3, relative flying height is measured along the vertical axis per unit of time along the horizontal axis. In addition, the loading sequence is represented on the left side of FIG. 3, and the unloading sequence is represented on the right side of FIG. 3.

Referring to both FIGS. 1 and 3, head 129 is parked on ramp 137, as illustrated at line segment 181. Prior to initiating a read/write operation, head 129 moves off ramp 137 and axially closer to disk 115, and loads to a relatively high (approximately 1000 nm or one micron). Typically, the heads will not properly read/write if the flying height is greater than about two times the nominal flying height. Hence, a slider flying at 1000 nm or "intermediate" flying state or height, as depicted at line segment 183, will not be able to read or write. Thus, head 129 is unable to read/write data to disk 115 at the intermediate flying height. To begin reading and/or writing to disk 115, head 129 moves to the low flying state or height illustrated at line segment 185. Upon the completion of the read/write operations, head 129 returns to ramp 137, as depicted at line segment 187.

As described above, a number of parameters may be varied to accomplish this desired sequence of flying heights. For example, head 129 may be moved from the intermediate flying height to the low flying height by pivoting head 129 radially inward toward the inner diameter of disk 115 (e.g., relatively lower rotational disk speed). The lower flying height also can be achieved by maintaining head 129 in the same radial position and actually reducing the rotational speed of disk 115. The other parameters of disk drive 111 (such as gram load, pitch static attitude, pitch and/or flexure stiffness, and air bearing surface design) will also affect the performance of the drive during operation. Furthermore, any combination of these parameters may be used to accomplish the same result.

The present invention has several advantages including the ability to reduce the risk of undesirable head/disk loading operations. This design also allows for any excess vibration to dissipate prior to initiating a read/write operation, again reducing the risk of a head crash. Moreover, the present invention utilizes known and readily controlled parameters of disk drives in order to accomplish the desired results.

While the invention has been shown or described in only some of its forms, it should be apparent to those skilled in the art that it is not so limited, but is susceptible to various changes without departing from the scope of the invention.

What is claimed is:

1. A method of operating a disk drive, comprising:
    (a) providing a disk drive having a disk, an actuator arm with a head, and a ramp;
    (b) parking the arm on the ramp such that the head is at a parked position;
    (c) rotating the disk relative to the head;
    (d) moving the head off the ramp toward the disk to a first flying height wherein the head is closer to the disk than the parked position such that the head is unable to read and write to the disk; and
    (e) moving the head from the first flying height to a second flying height wherein the head is closer to the disk than the first flying height such that the head is able to read and write to the disk.

2. The method of claim 1 wherein step (d) comprises flying the head above the disk at an altitude that is approximately two to twenty times greater than the second flying height.

3. The method of claim 1 wherein step (d) comprises flying the head above the disk at an altitude of approximately one micron.

4. The method of claim 1 wherein step (e) comprises moving the head radially relative to the disk.

5. The method of claim 1 wherein step (e) comprises decreasing a rotational speed of the disk.

6. A method of loading and unloading a head in a disk drive, comprising:
    (a) providing a disk drive having a disk, an actuator arm with a head, and a ramp;
    (b) parking the arm on the ramp such that the head is at a parked position;
    (c) rotating the disk relative to the head;
    (d) moving the head off the ramp toward the disk to a first flying height wherein the head is closer to the disk than the parked position such that the head is unable to read and write to the disk; and
    (e) moving the head from the first flying height to a second flying height by moving the head radially relative to the disk wherein the head is approximately two to twenty times closer to the disk than the first flying height such that the head is able to read and write to the disk.

7. The method of claim 6 wherein step (e) further comprises decreasing a rotational speed of the disk.

8. The method of claim 6 wherein step (d) comprises flying the head above the disk at an altitude of approximately one micron.

9. A disk drive, comprising:
    a base;
    a disk rotatably mounted to the base;
    an actuator arm pivotally mounted to the base and having a head for reading data from and writing data to the disk;
    a ramp mounted to the base for parking the arm in a parked position; wherein
        the head has a first flying state wherein the head is closer to the disk than the parked position such that the head is unable to read and write to the disk, and a second flying state wherein the head is closer to the disk than the first flying state such that the head is able to read and write to the disk.

10. The disk drive of claim 9 wherein the first flying state is on the order of one micron.

11. The disk drive of claim 9 wherein the head moves between the first and second flying states by moving the head radially relative to the disk.

12. The disk drive of claim 9 wherein the head moves between the first and second flying states by altering a rotational speed of the disk.

* * * * *

UNITED STATES PATENT AND TRADEMARK OFFICE
CERTIFICATE OF CORRECTION

PATENT NO.   : 6,680,811 B2
DATED        : January 20, 2004
INVENTOR(S)  : Gillis et al.

It is certified that error appears in the above-identified patent and that said Letters Patent is hereby corrected as shown below:

<u>Title page,</u>
Item [75], Inventors, please correct "Mike Suk" city from "Milpitas, CA" to -- San Jose, CA --

Signed and Sealed this

Thirtieth Day of March, 2004

JON W. DUDAS
*Acting Director of the United States Patent and Trademark Office*